United States Patent
Hoepner et al.

(10) Patent No.: US 9,630,557 B2
(45) Date of Patent: Apr. 25, 2017

(54) OPEN CONFINED AREA OBJECT DETECTION

(71) Applicant: SICK, INC., Minneapolis, MN (US)

(72) Inventors: Dale Hoepner, Minneapolis, MN (US); Monisha Shivanna, Minneapolis, MN (US); Aaron Rothmeyer, Minneapolis, MN (US); Don Alexander, Minneapolis, MN (US)

(73) Assignee: SICK, INC., Minneapolis, MN (US)

( * ) Notice: Subject to any disclaimer, the term of this patent is extended or adjusted under 35 U.S.C. 154(b) by 0 days.

(21) Appl. No.: 14/825,872

(22) Filed: Aug. 13, 2015

(65) Prior Publication Data

US 2017/0043716 A1 Feb. 16, 2017

(51) Int. Cl.
*B60Q 1/00* (2006.01)
*B60Q 9/00* (2006.01)
*G08G 1/16* (2006.01)

(52) U.S. Cl.
CPC .............. *B60Q 9/008* (2013.01); *B60Q 9/007* (2013.01); *G08G 1/166* (2013.01)

(58) Field of Classification Search
CPC ......... B60Q 9/008; B60Q 9/007; G08G 1/166
See application file for complete search history.

(56) References Cited

U.S. PATENT DOCUMENTS

| | | |
|---|---|---|
| 7,084,388 B2 | 8/2006 | Rejc |
| 7,380,375 B2 | 6/2008 | Maly |
| 8,547,234 B2 | 10/2013 | Maly et al. |
| 2015/0112543 A1* | 4/2015 | Binion ............... G07C 5/12 701/32.2 |
| 2015/0161872 A1* | 6/2015 | Beaulieu ............ B66C 13/40 340/686.6 |
| 2016/0046308 A1* | 2/2016 | Chung ............. B61L 25/025 701/20 |

OTHER PUBLICATIONS

Loading Dock Equipment—Product List "Traffic Lights—Stop and Go Lights", sales@loadingdocksupply.com; Sep. 30, 2014.
Sick Sensor Intelligence—Laser scanners "TiM5xx / TiM55x / Outdoor / Short Range" Preliminary data sheet, Sick AG, www.sick.com; Oct. 15, 2013.

* cited by examiner

*Primary Examiner* — Erin File
(74) *Attorney, Agent, or Firm* — Nath, Goldberg & Meyer; Jerald L. Meyer; Stanley N. Protigal (57) ABSTRACT

Alarm indications of objects (431, 631) in spaces (113) subject to vehicle movements are provided using a scanner unit configured to provide indications of directions and distances of objects within a scan area. A computer compares the signal output from a scanner unit (121) and resolves the signal output to a pattern of the indications of directions and distances, and further resolve multiple instances of the indications over time to resolve the pattern of indications and distances to movement corresponding to the movement of the objects (431, 631). The indications are compared to render an indication of objects (431) partially blocked by other ones (631) of the objects from line-of-sight of the scanner unit (121). Predetermined relative movements of the objects (431, 631) as resolved by the computer render predetermined indicator or alarm signals (341, 342, 345).

20 Claims, 6 Drawing Sheets

OPEN CONFINED AREA OBJECT DETECTION

BACKGROUND

Field

The present disclosure relates to using a scanner to detect objects located in and entering a confined area, in order to warn of instances when a vehicle or other object will strike or engage the object within the confined area. A specific non-limiting example would be detection of objects in a docking area and detection of a truck entering and backing into the docking area.

Background

This disclosure provides improvements to the techniques described in the independent claims relating to object detection and warning alarms incident to object detection.

In order to avoid accidents in work areas, it is often necessary to provide operators with awareness of objects in the path of vehicles. Similarly, it is desired to make other workers aware of the entry of a vehicle into a workspace. One non-limiting example of such a workspace is a loading dock, in which trucks and other vehicles are often backed into defined confined spaces. While mirrors and video arrangements are used, visibility is limited when backing the vehicle. A backing truck typically has an audible warning and is fairly obvious to people in the area, but a general warning may be ignored in noisy environments. In some cases, people in the area are used to hearing audible warnings from adjacent bays, which sound regardless if there is a danger of collision. There are also cases in which, despite availability of mirrors and video arrangements for the driver, further guidance is desired when backing up.

In some loading dock environments, the distance between a loading door for the building and the dock bumper against which the truck lands is minimal Therefore, if a pedestrian is standing in that area with the loading dock door closed, the pedestrian may be in an unsafe situation and, in a worst case scenario, not be able to get out of the way of the backing truck. It is also desired to warn drivers if a pedestrian is in the dock door area. In addition to collision warning, a warning is desired to warn truck drivers and dock door operators if pedestrians are standing in the dock door area.

One issue with optical scanning devices is to determine the size of the object being scanned. For example if a pedestrian is in a cargo bay, and another pedestrian enters the bay, that is generally not a cause for alarm. If a truck is parked in a loading bay and a pedestrian walks into that bay, it can be presumed that is generally not a cause for alarm and it can be presumed that the pedestrian is aware of the truck.

A different problem is in the detection of multiple objects. Detectors are available that can identify multiple objects, identify their relative distances and track their relative movements. Nevertheless, the presence of a small object in front of a larger object results in blockage of portions of the larger object. The sensed objects can appear as the small object and either a smaller version of the large object consistent with the unblocked portion, or splitting the larger object in two. In the case when the larger object is split into two, it is likely the blockage will reduce the total apparent combined size of the split object.

It is desired to use the techniques or configurations described in the preambles of the independent claims to warn truck drivers and dock door operatives if pedestrians are standing in the dock door area and also if the truck is backing-in. There are several different circumstances involving persons or objects in a loading bay and vehicles using a loading bay; however not all objects involve hazards and not all hazards require the same attention or the same kind of attention.

SUMMARY

Alarm indications are provided to indicate of objects in spaces subject to vehicle movements. A scanner unit is configured to provide indications of directions and distances of objects within a scan area and provide the indications as a signal output. A driver unit causes the scanner unit to scan the scan area and a computer is used to compare the signal output from the scanner unit and resolve the signal output to a pattern of the indications of directions and distances. The computer further resolves multiple instances of the indications over time to resolve the pattern of indications and distances to movement corresponding to the movement of the objects. The computer compares the indications of objects and of movements of the objects to render an indication of objects partially blocked by other ones of the objects from line of sight of the scanner unit. An indicator output is used to provide indications of predetermined relative movements of the objects as resolved by the computer, and used to render indicator or alarm signals.

BRIEF DESCRIPTION OF THE DRAWINGS

FIGS. 4A-4C are schematic diagrams showing movement of a trailer into a docking area.

FIGS. 11A-11D are schematic diagrams showing the potential occulting effect of objects in the foreground of the detection field.

DETAILED DESCRIPTION

Overview

Figure 1:
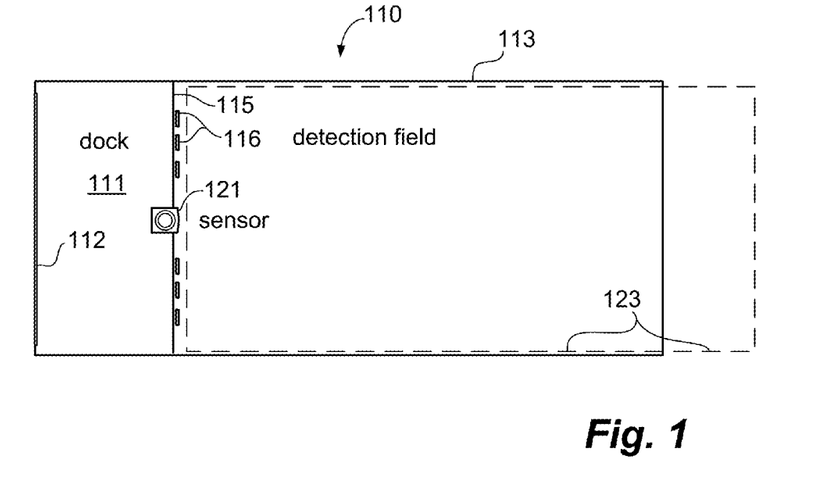
FIG. 1 is a schematic diagram showing a detection field in a docking area.

FIG. 1 is a schematic diagram showing a docking area 110 for loading and unloading vehicles such as semitrailers. Depicted is a loading dock 111, which is typically at a deck height elevation, a doorway 112 and a cargo bay 113. The cargo bay 113 provides a docking area into which the semitrailer is driven by backing up. The cargo bay 113 terminates at loading dock bumper 115, which may include additional bumper pads 116 (also called "dock bumpers").

According to the disclosed technology, scanner 121 provides detection of objects in the cargo bay, specifically in detection field 123, which may extend beyond the cargo bay 113 or terminate within the cargo bay 113 area. In either case, scanner 121 is intended to provide warnings or alarms as vehicles enter the detection field 123, including cargo bay 113 and approach the loading dock 111.

The sensing is useful in straight line backing, 90-degree backing and configurations requiring offset alley backing. In addition, there are other environments in which the described technology is useful, such as rail sidings, cargo transfer areas without loading docks, areas used for parking large vehicles in situations where driver visibility may be limited, and in private parking garages. The description of semitrailers in cargo bays with loading docks is given by way of non-limiting example.

Figure 2:
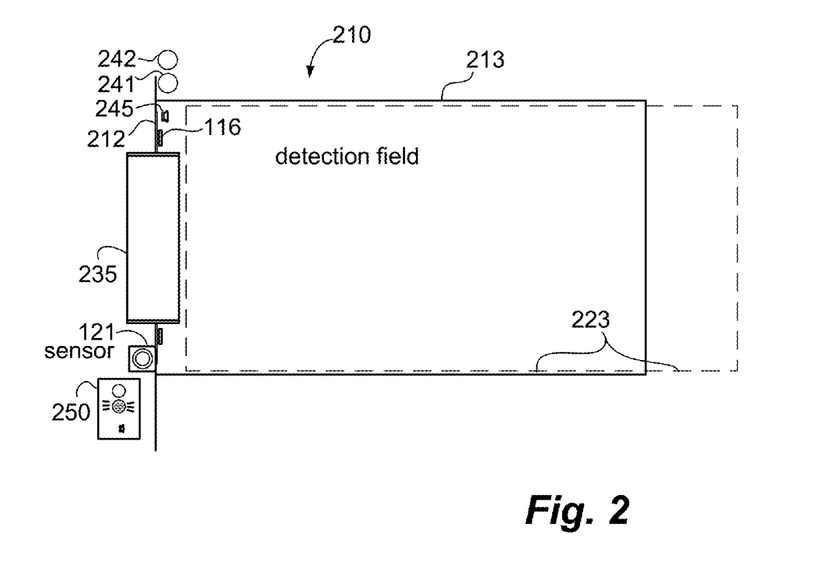
FIG. 2 is a schematic diagram showing a detection field in a docking area with a flush-to-door configuration for the loading dock.

In many cases, a cargo unloading area has no separate dock, but rather opens directly to a door as depicted in FIG. 2. If the loading dock is flush with the door, with no separate loading dock as depicted in FIG. 2, this can result in less opportunity for observation of potential hazards. FIG. 2 depicts docking area 210, doorway 212 and cargo bay 213. Scanner 121 is provided, which provides object sensing in detection field 223. Frequently a loading dock plate 235 and/or an edge of dock leveler is provided, which could also make it difficult to observe trailer movements if personnel must remain clear of the dock plate 235 or leveler. While most modern loading docks have this flush-to-door configuration, the configuration with a separate loading dock (FIG. 1, loading dock 111) will be described for clarity of explanation.

Also depicted in FIG. 2 are stack lights 241, 242, audio warning annunciator 245 and indoor annunciator light and audio set 250, which are used to provide indications of conditions sensed in detection field 223.

The disclosed technology is modelled on the use of an opto-electronic laser scanner that electro-sensitively scans the perimeter of its surroundings at a single plane with the aid of laser beams, which provides the function of scanner 121. In one non-limiting example, scanning is performed across a 270° sector. The opto-electronic laser scanner is given by way of non-limiting example and any suitable scanner can be used, provided that the scanner 121 is able to detect objects within a defined area such as detection field 123 or 223.

Scanner 121 may be located at any convenient place with a suitable view of cargo bay 113 or 213. In the example depicted in FIG. 1, scanner 121 is located at the center, below dock 111. It is also possible to mount scanner 121 to the side, as depicted in FIG. 2, either recessed behind the dock edge, or otherwise out of the way of physical engagement with backing trucks. If mounted to the side, scanner 121 may be located at, below or above dock level, provided that scanner 121 remains out of the way of vehicles backing into the bay 213. One advantage of positioning scanner 121 to the side of the bay 213 is that it is often possible to select a position where trucks would be unlikely to back into scanner 121.

By way of non-limiting example, scanner 121 can be a TiM55x scanner such as a TIM551-2050001 scanner, sold by SICK AG of Waldkirch, Germany. The TiM551 is an opto-electronic laser scanner that electro-sensitively scans the perimeter of its surroundings at a single plane with the aid of laser beams, with a maximum range with 10% reflectivity of 8 m. In addition to opto-electronic laser scanners, other suitable scanners capable of distance and azimuth sensing can be used.

Figure 3:
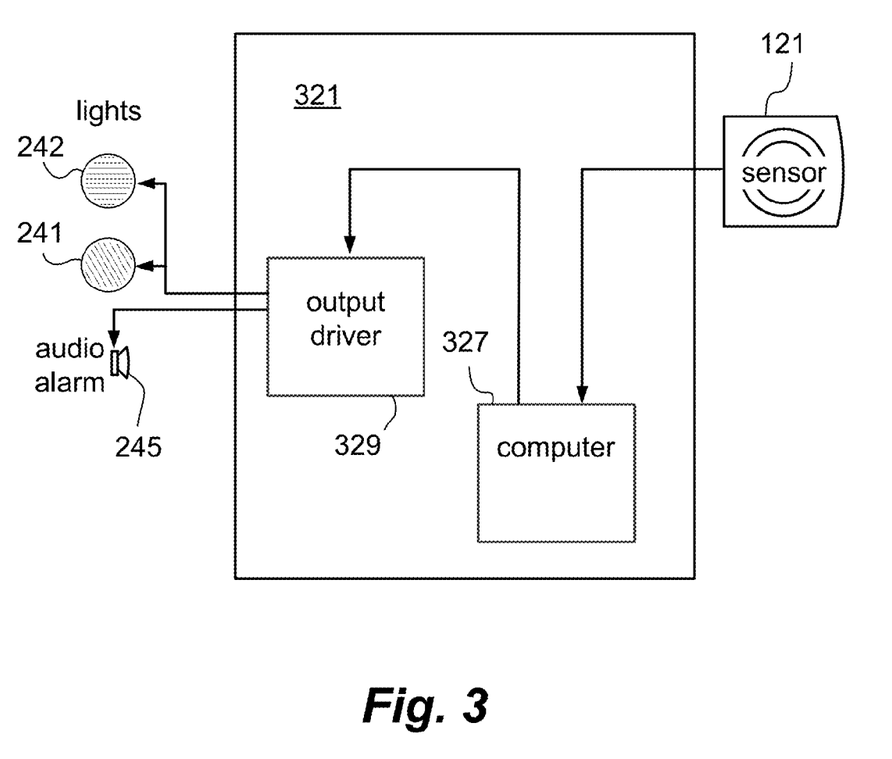
FIG. 3 is a schematic diagram showing a detection and warning system.

FIG. 3 is a schematic diagram showing a detection and warning system. Depicted are scanner 121 and control unit 321. Control unit 321 includes computer 327 and output driver 329. Scanner 121 provides raw data (angle and distance) and computer 327 evaluates the data and detects objects and trailer and gives signal to output driver. Output driver 329 provides outputs to stack lights 241, 242 and audio warning annunciator 245. In one non-limiting example, stack light 241 provides a steady state illumination in response to the presence of objects obstructing the path of a trailer backing toward loading dock bumper 115, but with no movement of the trailer detected. If the trailer is backing at a time when an object obstructing the path of the trailer is detected, stack light 241 remains illuminated but stack light 242 also provides an alarm signal, accompanied by an audible warning (audio warning annunciator 245). Stack light 242 provides a more notable warning, which may be by color, intensity and/or the combination of stack light 241 and 242 illuminated simultaneously with the audible warning. Stack light 242 may also provide flashing or strobe output at a safe optical frequency (e.g., <3 Hz). While stack lights 241, 242 are described as having "on" and "off" states, it is contemplated that they may also have additional states, such as low intensity flashing to indicate that the system is active. The two stack lights are given by way of non-limiting example, and it is feasible to use different combinations of stack lights, such as three lights or a single stack light. The individual lights can also be configured to provide different types of illumination such as flashing or different color displays for different warnings.

The present technology uses opto-electronic scanner 121 to detect objects within a detection field, and to define objects as a truck or other object, and to detect smaller objects, such as inanimate objects or persons that are in the detection field. Opto-electronic scanner 121 is then used to track each object. The scanned information is then used to warn truck drivers of possible obstructions, and to warn personnel of hazards.

The warning is provided through at least two outputs:
1. Visual alarm: Turns on when there is any obstacle in the detection field.
2. Audible alarm: Turns on when there is any obstacle between the door and the vehicle (e.g., trailer) while the vehicle is backing up to the dock door.

In one non-limiting configuration, a two-light system is positioned so as to be visible to a driver of a vehicle backing into the bay, but is also visible to personnel in the bay. In addition, the audible alarm is provided.

Operation

In a non-limiting example, an scanner 121 is used, having an angle resolution of 1 degree. The scanner 121 is also able to determine distance of sensed objects.

Figure 4A:
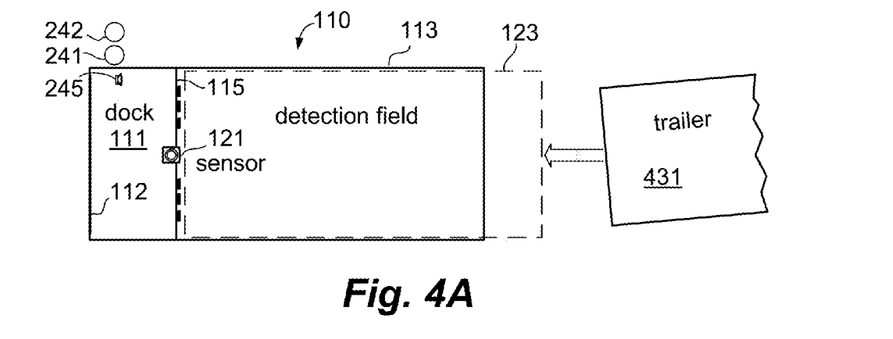
FIG. 4A shows the trailer approaching the loading bay and outside of a detection field.
Figure 4B:
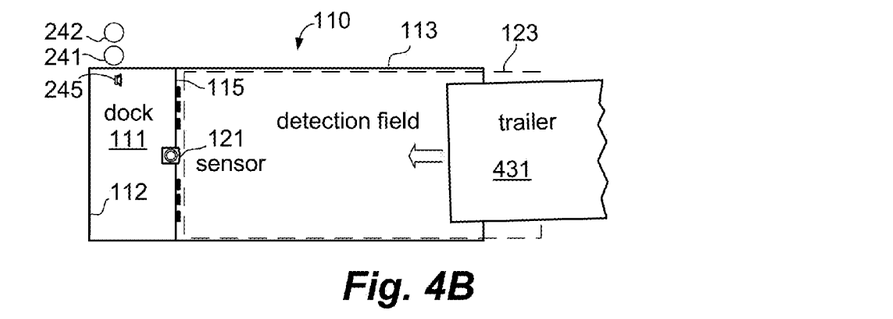
FIG. 4B shows the trailer having entered the loading bay and backing toward the loading dock.
Figure 4C:
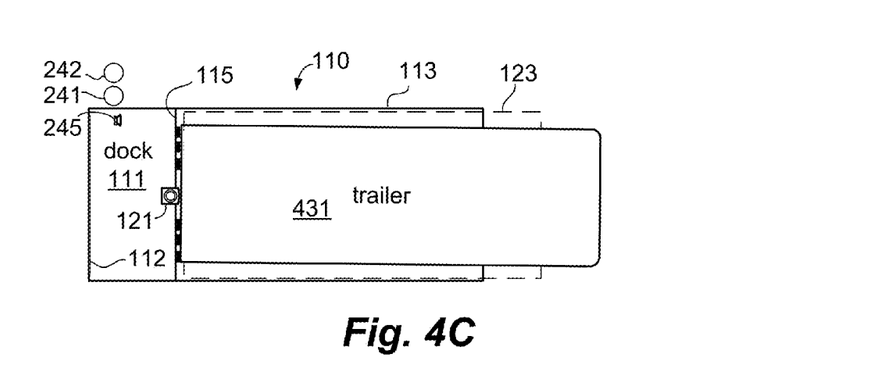
FIG. 4C shows the trailer having reached the loading dock.

FIGS. 4A-4C are schematic diagrams showing movement of a trailer 431 into the loading bay 113 of docking area 110. FIG. 4A shows the trailer 431 approaching the loading bay 113 and outside of the detection field 123. FIG. 4B shows the trailer 431 having entered the loading bay 113 and backing toward the loading dock 111. FIG. 4C shows the trailer 431 having reached the loading dock bumper 115. When the trailer 431 is outside of the detection field 123, as depicted in FIG. 4A, the presence of objects within the loading bay 113 is not a significant concern. As the trailer 431 enters the loading bay 112, as depicted in FIG. 4B, the system provides warnings of other objects in the loading bay 112. The type of warning depends on the circumstances, and in particular if the trailer 431 is backing into the loading bay 112. After the trailer 431 has reached the loading dock bumper 115, warnings are no longer necessary because the trailer 431 would not back further. This allows the system to discontinue warnings, which are more likely to reflect transfer of cargo in the truck than circumstances requiring warnings.

The scan by scanner 121 is performed at a scanning frequency of 15 Hz, meaning it performs 15 measuring processes per second and makes the measurement results continuously available in real time via an Ethernet interface. While it is unlikely that an object would enter the path of a backing truck within 1/15 second, the scan rate allows scanner 121 to determine and characterize movement. The field of view and the angular range is restricted to the detection field in front of the dock door. Beyond the dock door, the scanned range of scanner 121 expands, but if an object is sensed beyond the loading bay, the signal is disregarded. Alternatively, if an object sensed beyond the loading bay exhibits a movement which is likely to result in the object entering the bay, the predicted path may be reported.

The length of active detection, beyond which warnings are not initiated is determined by the user specification, but 8 m is a typical length. By not providing a warning beyond the specified length, false alarms are reduced. The width of the active area is set to 3 m, based on an average width of trailers being approximately 2.5 m. These widths are given by non-limiting example, so that, for example, if different dimensions are used for a loading bay or a different type of vehicle is present at the loading bay such as a rail car, the dimensions of the active area would differ. The length of the detection field 123 is limited by the capabilities of scanner 121, but the capabilities of scanner 121 can vary, depending on the reflectivity of the detected object. In order to prevent false alarms resulting from movements beyond the loading bay 113, signals are ignored beyond a predetermined distance in order to limit the length of the detection field 123. Typically, this distance to the end of the detection field 123 would exceed the length of the loading bay 113, but may be less than the length of the loading bay 113.

While it is intended that false alarms be avoided, it is possible to provide "soft alarm" indications in situations which would be ambiguous, such as a truck approaching near the loading bay 113 but not inside. An example of a "soft alarm" would be the illumination of both stack lights 241, 242, but without a strobe effect and/or without the audio alarm. Since this is a programmed operation, it may be possible to provide additional functions related to distance and other sensed conditions.

The dimensions establish the detection field; however, it is possible to have the detection field extend beyond the defined dimensions, but with a reduced degree of assurance that the objects would be detected. Such an extension of the detection field would be limited to areas in which detection would not create ambiguity, so that, by way of non-limiting example, sensed objects in adjacent bays would be excluded and therefore would not be in the detection field, but approach areas used primarily by vehicles entering the bay would be included in the detection field even though reliability of detection is diminished due to the increased distance from scanner 121.

In order to categorize objects in the detection field as a truck or obstacle the following parameters are quantified. The distances are given by way of non-limiting example:

Minimum size of the obstacle that can be present in the detection field (0.1 m)

Maximum size of the obstacle that can be present in the detection field (1 m).

Average width of the trailers backing up the dock door (assumed to be 2.5 m).

Control unit 321, uses computer 327, and is connected to scanner 121. Control unit 321 and receives signals from opto-electric laser scanner 121, which it uses computer 327 to determine distances of sensed objects and to reconstruct occulted objects blocked by other objects. Control unit 321 also controls scanning so that the detection field is repeatedly scanned by scanner 121, for example at the aforementioned 15 Hz scanning frequency, which provides sensing of movement of the detected objects. Control unit 321 is also connected to an annunciation controller which controls stack lights 241, 242 and audio warning annunciator 245.

Scanner 121 scans the detection field continuously and the algorithm running on the PC uses the scanned data to detect the presence of the object or truck in the detection field, based on the detected objects two digital outputs are transmitted to a light control, which in turn uses it to either turn the stack lights 241, 242 on or off depending on the result of the detection.

The two stack lights 241, 242 correspond to the visual alarm as required by the user. Audible alarm 245 is used coincidentally with the stack lights 241, 242 to provide a combined visual alarm, and audio warning annunciator 245 provides an audible alarm.

Figure 5:
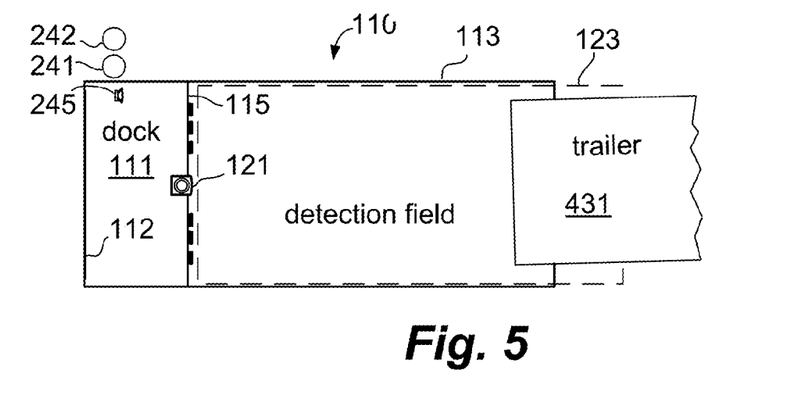
FIG. 5 is a schematic diagram showing a detection field in a docking area, with a trailer stationary within the detection field and no detected objects in the foreground.

FIG. 5 is a schematic diagram showing detection field 123 in a docking area, with trailer 431 stationary within detection field 123 and no detected objects in the foreground. No alarm is displayed because, other than trailer 431, there is no additional object detected in the bay, and of course the driver would be aware the trailer 431 itself is in the bay.

Figure 6:
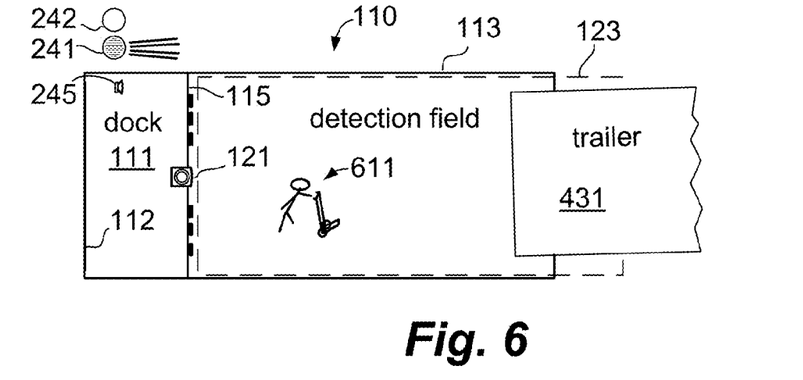
FIG. 6 is a schematic diagram showing an object in the foreground of the detection field and a trailer within the detection field but stationary.

FIG. 6 is a schematic diagram showing an object 611 in the foreground of detection field 123 and trailer 431 within detection field 123 but stationary. Stack light 241 is illuminated because of object 611 in the foreground, but stack light 242 is not illuminated because trailer 431 is stationary.

Figure 7:
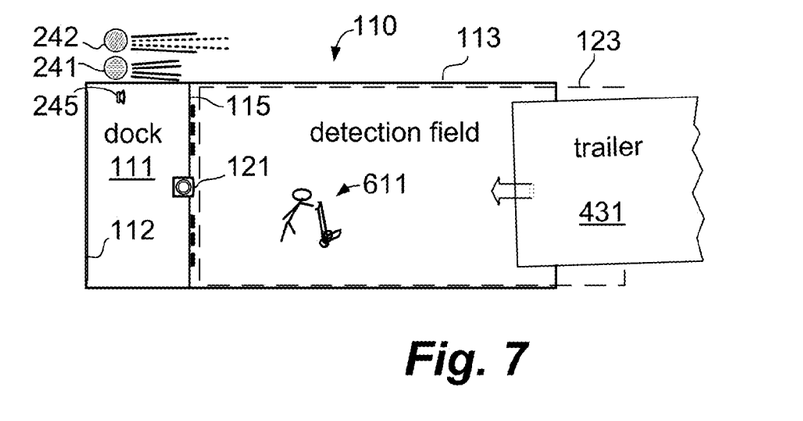
FIG. 7 is a schematic diagram showing an object in the foreground of the detection field and a trailer within the detection field backing toward the loading dock.

FIG. 7 is a schematic diagram showing an object 611 in the foreground of the detection field and trailer 431 within the detection field. Trailer 431 is backing toward the loading dock. Stack lights 241 and 242 would illuminate and audio annunciator 245 would sound to alert the driver of the potential hazard.

Figure 8:
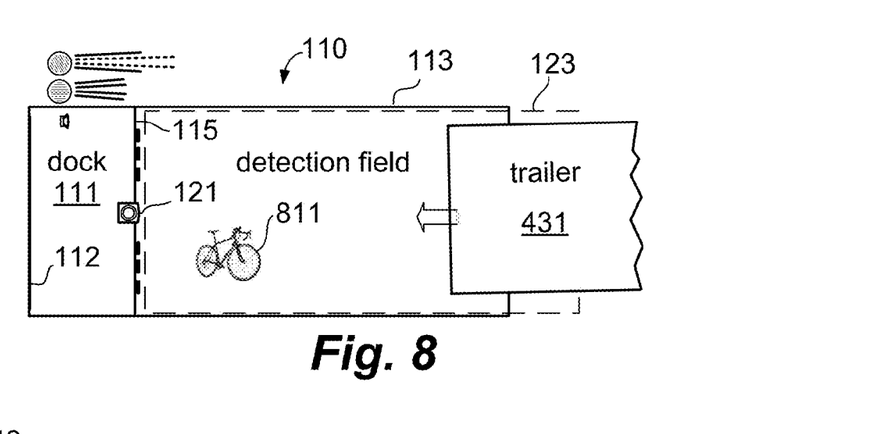
FIG. 8 is a schematic diagram showing an inanimate object in the foreground of the detection field and a trailer within the detection field backing toward the loading dock.

FIG. 8 is a schematic diagram showing an inanimate object 1811 in the foreground of the detection field and trailer 431 within the detection field backing toward the loading dock. Again, stack lights 241 and 242 would illuminate and audio annunciator 245 would sound to alert the driver of the potential hazard.

Figure 9:
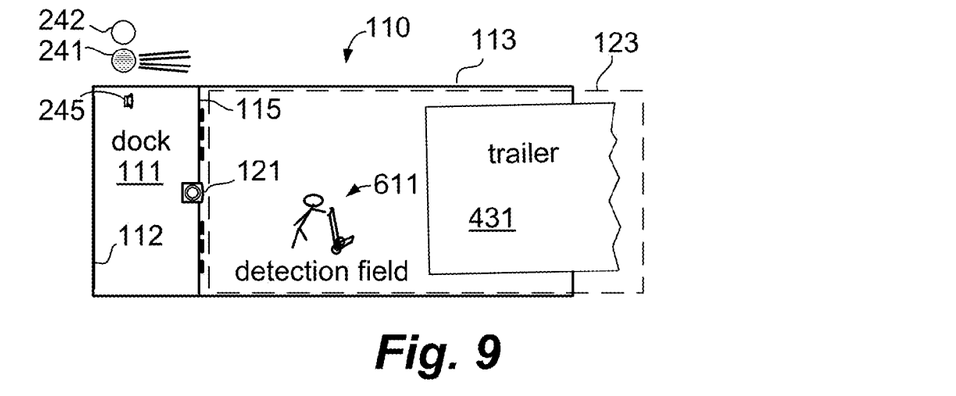
FIG. 9 is a schematic diagram showing an object in the foreground of the detection field and a trailer within the detection field but again stopped.

FIG. 9 is a schematic diagram showing object 611 in the foreground of the detection field and the trailer 431 within the detection field but again stopped. Stack light 241 is illuminated because of object 611 in the foreground, but stack light 242 is no longer illuminated because the trailer 431 is stationary. This situation is similar to that of FIG. 6, in that the hazardous condition exists, but trailer 431 is no longer backing up. When object 611 moves from or is cleared from detection field 123, stack light 242 is switched off.

Figure 10:
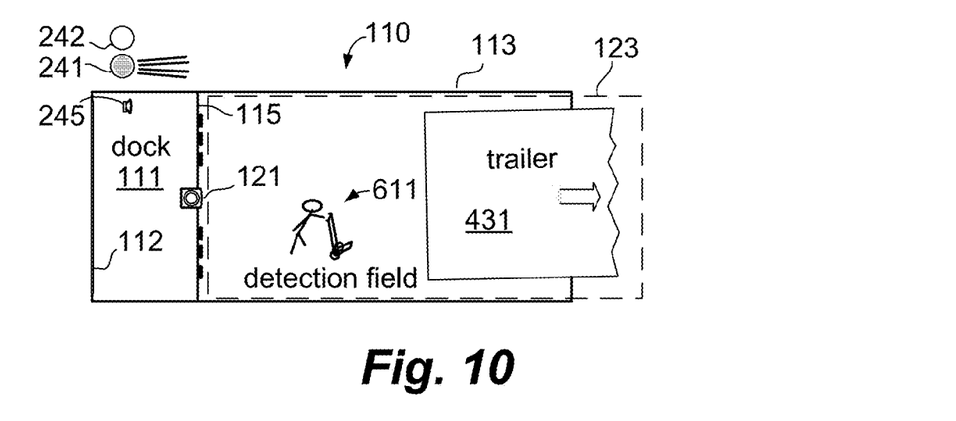
FIG. 10 is a schematic diagram showing an object in the foreground of the detection field and a trailer pulling away from the loading dock.

FIG. 10 is a schematic diagram showing an object 611 in the foreground of the detection field and the trailer 431 pulling away from the loading dock. Stack light 241 is illuminated because of the hazardous condition, but since trailer 431 is pulling away, it is not necessary to provide an alarm indication. If the driver is lining up trailer 431 to back in, then the driver should be aware of the hazard. Alternatively, stack lights 241 and 242 may be left off under or in a "standby" state, and audio warning annunciator 245 is quiet.

Sensing of Multiple Objects

Scanning is performed across a predetermined arc of coverage, which in one non-limiting example, provides scanning across a 270° sector. This presents two issues:
1. The scan can extend into adjacent bays; and
2. An object in the foreground can occult some of another sensed object, such as a vehicle.

For objects in areas adjacent the scanned area (e.g., a scanned loading dock bay), the horizontal angle (azimuth) combined with distance can be used to cancel readings which are outside of the defined area. This avoids triggering the warning alarms based on operations in adjacent bays, and avoids detecting items in the boundary areas as objects that would trigger warning alarms. Similarly, it may be desirable to ignore alarms caused by detection of objects that are closer than a predetermined distance from a line parallel to the loading dock bumper 115. It is particularly useful to avoid such alarms if scanner 121 is mounted behind loading dock bumper 115, because personnel and objects in that area are not a hazardous condition or potential hazards can easily be avoided without the use of alarms.

This is different from readings which are beyond the defined areas for which sensing is not assured, but which are nevertheless relevant. For example, if the sensing is designed for coverage to 8 m from the edge of the dock, a sensed vehicle at 12 m backing into the bay may be relevant and detection of that vehicle in movement provide early warning. As a practical matter, it is more likely that scanner 121 will detect a vehicle at longer distances than a smaller and less reflective object, such as a pedestrian.

Multiple objects create issues when a near object such as a pedestrian or inanimate object partially blocks line-of-sight sensing of a further object such as a vehicle. The vehicle can be expected to be of certain dimensions, for example up to 2.6 m width for most semi-trailers, with heights variable up to 4.5 m. If an object is blocking one side of the vehicle from the scanner, the sensed dimensions of the van can be substantially less, but distance and the reduced dimensions can be used to resolve the partially-obstructed vehicle as a vehicle. This is important because the movement of a vehicle when another object is present can trigger an alarm, but the movement of a pedestrian (with no vehicle present) should not trigger the alarm.

Blocking of line-of sight sensing in the middle of a vehicle presents the scanner with two narrow objects approaching from a distance. This situation is resolved by detecting the presence of one or more objects in a foreground and detection of one or more objects at a further distance. If the objects at the further distance are at approximately the same distance and moving synchronously, and the gap coincides with objects in the foreground, the system would resolve the objects at the further distance to be a single vehicle.

The detection of both the object and the vehicle depends in part on the width of the vehicle meeting predetermined requirements. If an object is positioned so as to block part of the vehicle, then a determination is made based on the detected size of the object and the movement of the vehicle as to whether the blocked object is potentially a vehicle. The system then resolves the object to a single object, and de-occults the blocked portions.

Figure 11A:
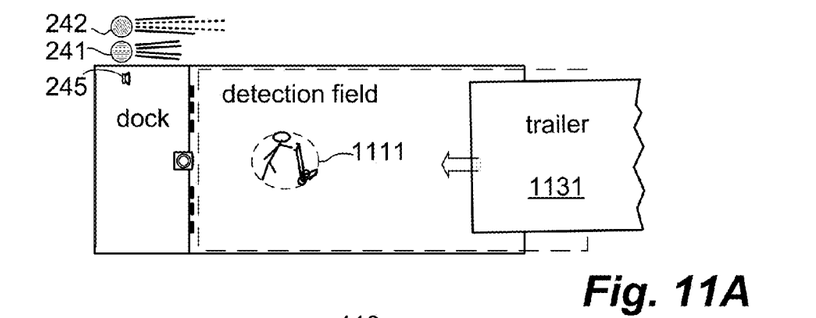
FIG. 11A shows a trailer having entered the loading bay and backing toward the loading dock, with an object in the foreground.

FIGS. 11A-11D are schematic diagrams showing the potential occulting effect of objects 1111 in the foreground of the detection field. FIG. 11A shows a trailer 1131 having entered the loading bay and backing toward the loading dock, with object 1111 in the foreground, which is an expected circumstance.

Figures 11B, 11C:
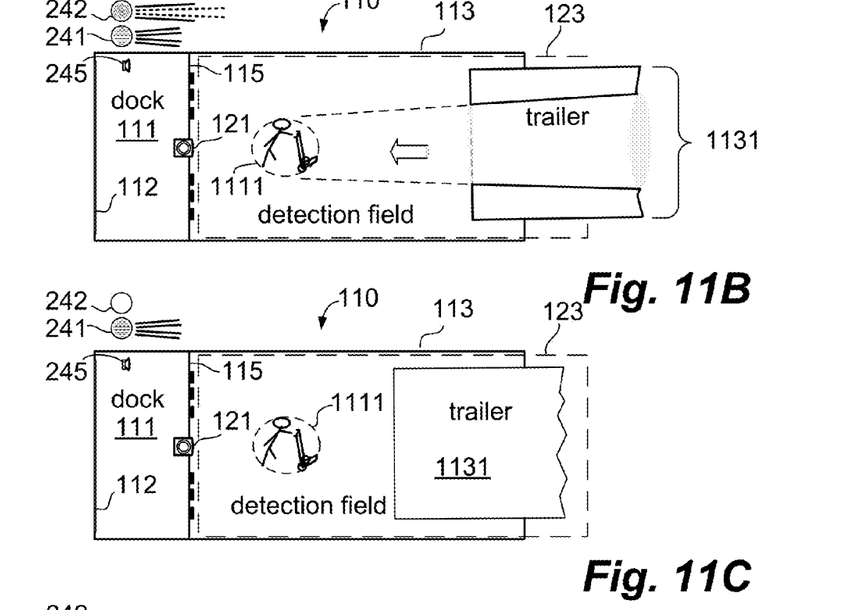
FIG. 11B shows the effect of the object in the foreground blocking the line-of-sight view of the trailer as detected by the scanner.
FIG. 11C shows the object in the foreground blocking the line of sight view of the trailer, with the trailer stationary

FIG. 11B shows the same configuration as FIG. 11A, but showing the effect of object 1111 in the foreground blocking the line-of-sight view of the trailer 1131 as detected by scanner 121. Depending on the positioning of scanner 121, object 1111 may partially block the view of trailer 1131, and as a result, trailer 1131 may be sensed as two smaller objects. In this instance, computer 327 in control unit 321 resolves the two objects in the background as a single object, and renders an alarm output, causing stack lights 241, 242 and audio warning annunciator 245 to provide the appropriate alarm indications.

FIG. 11C shows the object in the foreground blocking the line of sight view of the trailer, with the trailer stationary. In that situation, computer 327 in control unit 321 resolves the two objects in the background as a single object (trailer 1131), but does not render an alarm output. Using the example configuration above, stack light 241 indicates a warning, but stack light 242 and audio warning annunciator 245 remain off.

Figure 11D:
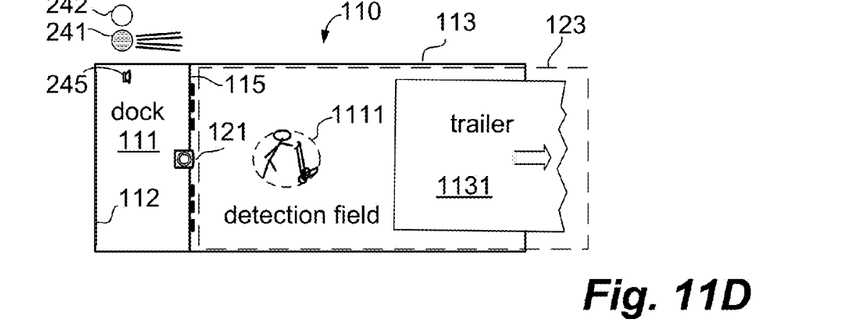
FIG. 11D shows the effect of the object in the foreground blocking the line of sight view of the trailer, with the trailer pulling away from the loading dock.

FIG. 11D shows the effect of object 1111 in the foreground blocking the line of sight view of the trailer, with the trailer pulling away from the loading dock. Computer 327 resolves the two objects in the background as a single object (trailer 1131), but does not render an alarm output. Using the example configuration above, stack light 241 either indicates a warning or no warning, but stack light 242 and audio warning annunciator 245 remain off.

In each instance, the movement of the object 1131 at a further distance (the vehicle) is used to determine alarm status in combination with detected objects (e.g., object 1111) in the foreground.

Sensing and Alarm States

Variations of the warning alarms are possible in accordance with operational considerations. In addition, it may be desired to provide an "on" or "green light" signal indicating that the system is in operation. In addition to an "on" signal, two "stack lights" are used, and an audio alarm is provided. In one non-limiting example, the "stack lights" are an orange and a red light, positioned at a convenient location to be viewed while the driver is backing up; however, in implementation, different color schemes may be used. Accordingly, reference will be made to a "first stack light" and a "second stack light". It is noted that it is not intended to restrict the physical positions or arrangements of the stack lights to any one configuration, provided that the driver is able to see both stack lights. These "stack lights" are distinct from any "on" light used to show general status of the system. The states can include:

No vehicle detected; no object detected—both stack lights OFF

Vehicle detected and backing toward bay; no object detected—both stack lights OFF; audible alarm OFF Vehicle detected and backing within bay; no object detected—both stack lights OFF; audible alarm OFF comment: Vehicle backing up in absence of objects Object detected in the bay; no vehicle detected—first stack light ON; second stack light OFF; audible alarm OFF comment: Presence of only object in detection field Object detected in the bay; vehicle backing-up movement detected—first stack light ON; second stack light ON; audible alarm ON comment: Vehicle backing up in presence of objects Object detected in the bay; vehicle detected with no movement—first stack light ON; second stack light OFF; audible alarm OFF Object detected in the bay; vehicle forward movement detected—first stack light ON; second stack light OFF; audible alarm OFF Object detected in the bay near center; backing-up movement detected from two objects, one on each side of object near center—first stack light ON;

second stack light ON; audible alarm ON comment: Object splits image of vehicle, so two moving objects are a single vehicle backing up. Vehicle backing up in presence of objects.

In addition to warnings and indications provided by control unit 321, stack lights 241, 242 may be configured to be manually controlled, for example to indicate permitted or non-permitted docking at individual bays.

If on-board annunciators become available and use standardized signal inputs, the alarms can also be transmitted for repeating by such annunciators.

Since the movement of the vehicle is detected, it is additionally possible to provide assistance in docking the vehicle. If the vehicle is moving too quickly relative to the position of its landing position against the dock, the system may provide an alarm. Similarly, the system may be used to provide a visual and/or audible signal as the vehicle closely approaches the landing position, in a manner similar to parking assist monitors on board vehicles.

If an object is sufficiently close to sensor 121 to substantially block the view of the sensor 121, the blockage would result in the sensor 121 being unable to view a backing trailer. The blocked condition would generate an indication similar to that of a sensed object obstructing the path of a backing trailer, and generate an "object detected" signal. The minimum distance is dependent on size and location of object in front of scanner 121.

CONCLUSION

There examples of stack lights 241, 242 and audio warning annunciator 245 are given by way of non-limiting example, as there are various ways in which warning signals can be provided. For example, if a large object (corresponding to a trailer) is sensed, with no further objects sensed, a green light can be displayed, or the green light may be maintained continuously with no object sensed or only a large object sensed. The display of the lights can be made to depend on approval to enter a particular bay, so that, for example, a driver directed to a particular bay would have a positive indication of the assigned bay. The warnings can also be provided with a single light, which may change its display characteristics according to the movement of the trailer.

As described earlier with respect to FIG. 2, in addition to the warnings, separate indoor annunciator light and audio set 250 may be provided inside the cargo bay door 212. Annunciator set 250 may use information from scanner 121 to indicate to personnel inside the terminal of the approach and presence of a trailer, in order that the personnel inside the terminal may respond accordingly. Annunciator set 250 may be responsive to control unit 321 to provide indications of warnings provided by the system and/or the presence of vehicles in the respective bays. Annunciator set 250 may also be used to indicate the presence of objects in the respective bays.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. Apparatus for providing alarm indications of objects in spaces subject to vehicle movements, the apparatus comprising:
a scanner unit configured to provide indications of directions of movement of objects and distances of objects within a scan area and provide the indications as a signal output;
a driver unit configured to cause the scanner unit to scan the scan area;
a computer configured to compare the signal output from the scanner unit and resolve the signal output to a pattern of the indications of directions of movement of objects and distances of objects over multiple instances of the indications over time, to determine movement corresponding to the movement of the objects based on the pattern of the indications of directions of movement and distances;
the computer further configured to compare the indications of objects and of movements of the objects to render an indication of objects partially blocked by other ones of the objects from line-of-sight of the scanner unit; and
an indicator output, whereby predetermined relative movements of the objects as resolved by the computer render predetermined indicator or alarm signals.

2. The apparatus as described in claim 1, wherein a detected object in a foreground position with respect to the scanner unit in combination with a detected object in a background having a predetermined minimum size having at least one movement status renders the predetermined indicator or alarm signals.

3. The apparatus as described in claim 1, wherein:
a detected object in a foreground position with respect to the scanner unit in combination with a detected object in a background having a predetermined minimum size having one movement status renders the predetermined indicator or alarm signals; and
the detected object in a foreground position with respect to the scanner unit in combination with the detected object in the background having a different movement status renders a different type of the predetermined indicator or alarm signals.

4. The apparatus as described in claim 1, wherein:
a detected object in a foreground position with respect to the scanner unit in combination with a detected object in the background having a predetermined minimum size corresponding to a vehicle having one movement status corresponding to at least one type of movement of the vehicle renders one type of the predetermined indicator or alarm signals; and
the detected object in a foreground position with respect to the scanner unit in combination with the detected object in the background having a different movement status renders a different type of the predetermined indicator or alarm signals.

5. The apparatus as described in claim 1, wherein the scanner unit comprises an opto-electronic laser scanner that electro-sensitively scans the perimeter of its surroundings at a single plane with the aid of laser beams.

6. The apparatus as described in claim 1, wherein the scanning unit provides an azimuth indication, permitting sensing within a predetermined boundary, while disregarding indications outside the predetermined boundary.

7. The apparatus as described in claim 1, wherein the scanning unit provides an azimuth and the indication of distance of objects, thereby sensing within a predetermined boundary set by a user, and disregarding indications outside the predetermined boundary.

8. Method for providing alarm indications of objects in spaces subject to vehicle movements, the method comprising:
configuring a scanner unit to provide indications of directions of movement of objects and distances of objects within a scan area and provide the indications as a signal output and driving the scanner unit to scan the scan area;
using a computer to compare the signal output from the scanner unit and to resolve the signal output to a pattern of the indications of directions of movement of objects and distances of objects over multiple instances of the indications over time, to determine movement corresponding to the movement of the objects based on the pattern of the indications of directions of movement and distances;
using the computer to compare the indications of objects and of movements of the objects to render an indication of objects partially blocked by other ones of the objects from line-of-sight of the scanner unit; and
using predetermined relative movements of the objects as resolved by the computer to render predetermined indicator or alarm signals.

9. The method as described in claim 8, wherein a detected object in a foreground position with respect to the scanner unit in combination with a detected object in a background having a predetermined minimum size having at least one movement status renders the predetermined indicator or alarm signals.

10. The method as described in claim 8, wherein:
a detected object in a foreground position with respect to the scanner unit in combination with a detected object in a background having a predetermined minimum size having one movement status renders the predetermined indicator or alarm signals; and
the detected object in a foreground position with respect to the scanner unit in combination with the detected object in the background having a different movement status renders a different type of the predetermined indicator or alarm signals.

11. The method as described in claim 8, wherein:
a detected object in a foreground position with respect to the scanner unit in combination with a detected object in the background having a predetermined minimum size corresponding to a vehicle having one movement status corresponding to at least one type of movement of the vehicle renders one type of the predetermined indicator or alarm signals; and
the detected object in a foreground position with respect to the scanner unit in combination with the detected object in the background having a different movement status renders a different type of the predetermined indicator or alarm signals.

12. The method as described in claim 8, wherein the scanner unit comprises an opto-electronic laser scanner that electro-sensitively scans the perimeter of its surroundings at a single plane with the aid of laser beams.

13. The method as described in claim 8, wherein the scanning unit provides an azimuth indication, permitting sensing within a predetermined boundary, while disregarding indications outside the predetermined boundary.

14. The method as described in claim 8, wherein the scanning unit provides an azimuth and the indication of distance of objects, thereby sensing within a predetermined boundary set by a user, and disregarding indications outside the predetermined boundary.

15. Apparatus for providing alarm indications of objects in spaces subject to vehicle movements, the apparatus comprising:
a scanner unit for providing indications of directions of movement of objects and distances of objects within a scan area and provide the indications as a signal output;
output means for causing the scanner unit to scan the scan area;
a computer configured to compare the signal output from the scanner unit and resolve the signal output to a pattern of the indications of directions of movement of objects and distances of objects over multiple instances of the indications over time, to determine movement corresponding to the movement of the objects based on the pattern of indications of directions of movement and distances;
the computer further configured to compare the indications of objects and of movements of the objects to render an indication of objects partially blocked by other ones of the objects from line-of-sight of the scanner unit; and
indicator means, whereby predetermined relative movements of the objects as resolved by the computer render predetermined indicator or alarm signals.

16. The apparatus as described in claim 15, wherein a detected object in a foreground position with respect to the scanner unit in combination with a detected object in a background having a predetermined minimum size having at least one movement status renders the predetermined indicator or alarm signals.

17. The apparatus as described in claim 15, wherein:
a detected object in a foreground position with respect to the scanner unit in combination with a detected object in a background having a predetermined minimum size having one movement status renders the predetermined indicator or alarm signals; and
the detected object in a foreground position with respect to the scanner unit in combination with the detected object in the background having a different movement status renders a different type of the predetermined indicator or alarm signals.

18. The apparatus as described in claim 15, wherein:
a detected object in a foreground position with respect to the scanner unit in combination with a detected object in the background having a predetermined minimum size corresponding to a vehicle having one movement status corresponding to at least one type of movement of the vehicle renders one type of the predetermined indicator or alarm signals; and
the detected object in a foreground position with respect to the scanner unit in combination with the detected object in the background having a different movement status renders a different type of the predetermined indicator or alarm signals.

19. The apparatus as described in claim 15, wherein the scanner unit comprises an opto-electronic laser scanner that electro-sensitively scans the perimeter of its surroundings at a single plane with the aid of laser beams.

20. The apparatus as described in claim 15, wherein the scanning unit provides an azimuth and the indication of distance of objects, thereby sensing within a predetermined boundary set by a user, and disregarding indications outside the predetermined boundary.

\* \* \* \* \*